June 9, 1931.  J. D. LANGDON  1,809,343

AUTOMATIC COUPLER VALVE

Filed Sept. 4, 1928

INVENTOR.

BY J. D. Langdon

ATTORNEYS.

Patented June 9, 1931

1,809,343

UNITED STATES PATENT OFFICE

JESSE D. LANGDON, OF LOS ANGELES, CALIFORNIA

AUTOMATIC COUPLER VALVE

Application filed September 4, 1928. Serial No. 303,825.

This invention relates to automatic coupler valves, particularly for use where it is desired to couple a sprinkler or hose connection onto a valve and open said valve during the operation of making the coupling.

The primary object in my invention is to provide means for sealing the connection between a valve and a coupling device for said valve in such a manner that when the valve is open there will be no leakage of water between the coupler and the valve.

Another object in my invention is to provide means of releasing the pressure exerted against a valve member in such a manner that minimum force is needed to open said valve member against any opposing fluid pressure.

Another object in my invention is to provide an oscillating valve member to facilitate the opening of the valve against pressure.

A still further object in my invention is to automatically lock the coupling in operative position when attached to the valve.

Other and further objects in my invention will appear as the description proceeds. The invention is illustrated in the accompanying drawings wherein:—

Like numbers indicate identical parts in the different figures of the drawings. Letters are used to show limitations in form.

It is understood that the following drawings and description are for the purpose of illustration only, and the structure shown may be changed within the scope of what is claimed.

A coupler cap —2— is attached to a valve body —1— by means of cams —8— of which there are two at opposite sides of the coupler cap —2—, which cams engage corresponding cams —7— located opposite to one another on the valve body —1—.

Figure 2:
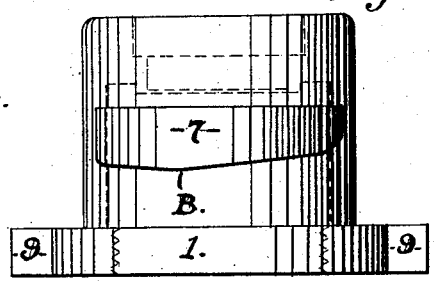
Fig. 2 is a side elevation of the valve body.

The valve body —1— represents the male portion of the device while coupler cap —2— represents the female portion. The confronting faces of the cams —7— and —8— are reverse to one another. It will be noted in Fig. 2 that the lower face of the valve body cam —7— has a downward pitch for approximately two-thirds of its total length to point —B— from which point the lower face of the cam —7— rises a short distance for the rest of its length. The cams —8— being oppositely disposed to the cams —7—, it will be seen that by rotating the cams in opposite directions to one another the apices —B— when moved past one another will act as a friction lock to prevent accidental reverse rotation. The valve body has stops —9— for the contact of a stop —10— which is extended downwardly slightly from the rim of the cap —2— to limit the rotation of the coupler cap and body relatively to one another in attaching them. The cap and body are therefore locked frictionally in assembled position by fluid pressure within the valve body which tends to force the coupler cap away from the valve body.

A tubular valve opening member —4— is screw-threaded into the cap centrally within said cap, and an expansion washer —5— embraces said member —4—. Said washer is disposed between the external shoulders —E— and —F— with which the member —4— is provided, said shoulders providing an annular channel retaining said washer in place therein.

Figure 3:
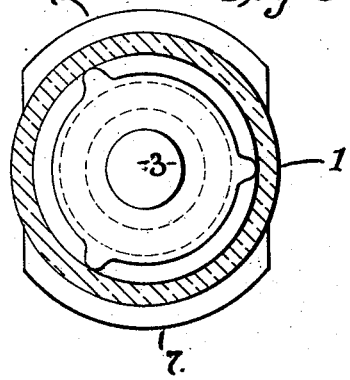
Fig. 3 is a transverse cross section of the valve body and a plan view of the valve member.
Figure 4:
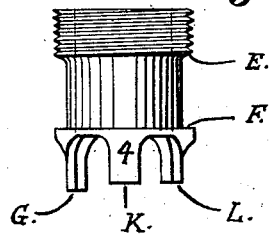
Fig. 4 is a side elevation of valve opening member.

The cap has a recess —H— receiving one end of the washer, and the valve body has a recess —C— into which the washer telescopes when the cap and body are moved together, thereby providing a seal between the cap and body during the movement thereof together and before the valve is opened. The member —4— moves against a shoulder —A— of the cap to limit the compression of the washer between the shoulder —F— and recess —H—. The washer is compressed by the action of the cams —7— and —8— when the cap and body are rotated relatively to one another into assembled relation. The compression of the washer also serves to hold the cams —7— and —8— in frictional locking position, in addition to the expansive action of the pressure fluid. A valve member or disk —3— is movable in the valve body to contact with the valve seat —11— which surrounds the central opening of the valve body which receives the valve opening member —4—. As seen in Fig. 3, the valve member has outstanding lugs to contact with the wall of the valve body for maintaining the valve member concentrically within the valve body and to provide a water passage of uniform width between the valve body and valve member.

A spring —6— is confined between the valve member and a shoulder of the valve body. Said spring may also seat against a plug, nipple or pipe screwed into the opening —D— of the valve body.

Figure 1:
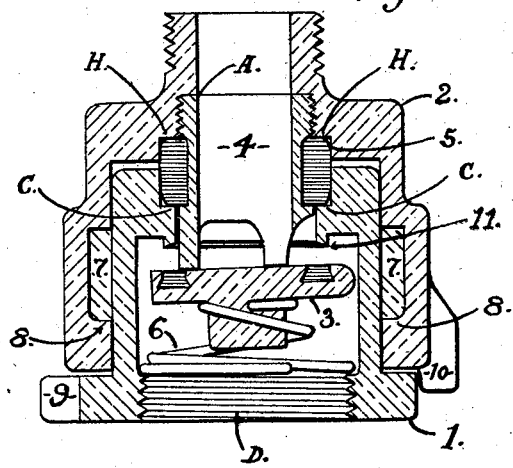
Fig. 1 is a diametrical section of the device and shows the valve in open position.

The member —4— has the projecting fingers —G—, —K— and —L— which protrude beyond the valve seat —11— when the cap and body are assembled, as seen in Fig. 1. The finger —G— is longer than or projects beyond the fingers —K— and —L—, so that when the cap and body are moved together, the valve member may be started open with minimum resistance. The finger —G— will tilt the valve member from its seat, and the cap and body having relative rotation during the assembling thereof, the finger —G— and valve member will also have relative rotation to assist in opening the valve member easily and with little force. The valve member is thus tilted open by the finger —G— which has a rotary movement relatively to the valve member.

As the valve member is opened slightly the flow of fluid is started, and the valve member may therefore be moved open with less resistance. The valve member is thus opened with ease during the movement of the cap and body together.

Having thus described the invention, what is claimed is:—

1. A coupler valve comprising two members having interengageable means to hold them together, and a bodily movable valve member seatable in one of the firstnamed members, the other firstnamed member having means to unseat said valve member with a tilting motion and to then move the valve member bodily from its seat when said firstnamed members are moved together.

2. A coupler valve comprising two members having interengageable means to hold them together, and a bodily movable valve member seatable in one of the firstnamed members, the other firstnamed member having means projecting therefrom to contact with the valve member at a plurality of points when the firstnamed members are moved together to unseat said valve member with a tilting motion and to then move the valve member bodily from its seat.

3. A coupler valve comprising two members having interengageable means to hold them together, and a valve member seatable in one of the firstnamed members, the other firstnamed member having fingers of different lengths projecting therefrom to contact with said valve member when the firstnamed members are moved together to unseat said valve member with a tilting motion.

4. A coupler valve comprising two members having interengageable means to hold them together, a valve member seatable in one of the firstnamed members, and a tubular valve opening member carried by the other firstnamed member and adapted to contact with said valve member when the firstnamed members are moved together, said valve opening member having fingers of different lengths projecting therefrom for unseating said valve member with a tilting movement.

5. A coupler valve comprising a valve body, a cap to fit over said body, said body and cap having interengageable portions to hold them together, a valve member seatable in the valve body, a tubular valve opening member screw-threaded within the cap and adapted to contact with the valve member to unseat said valve member when the body and cap are moved together, said valve opening member having a shoulder, and a washer compressed between said shoulder and cap, the valve body having a recess to receive said washer.

6. A coupler valve comprising two members having interengageable portions for the relative rotary connection of said members, and a bodily movable valve member seatable in one of the firstnamed members, the other firstnamed member having portions spaced from the center of the valve member to contact with the valve member and tilt same open and to then move the valve member bodily from the seat when the firstnamed members are rotated into engagement.

7. A coupler valve comprising two members having interengageable portions for the rotary connection of said members, and a valve member seatable in one of the firstnamed members, the other firstnamed member having projecting fingers spaced from the center of the valve member to contact with the valve member with a rotary movement when the firstnamed members are rotated into engagement, for unseating said valve member, said fingers projecting to different distances to open said valve member with a tilting movement.

JESSE D. LANGDON.